United States Patent
Antoun et al.

(10) Patent No.: US 9,613,323 B2
(45) Date of Patent: Apr. 4, 2017

(54) ORGANIZATIONAL AGILITY DETERMINATION ACROSS MULTIPLE COMPUTING DOMAINS

(75) Inventors: Samuel Antoun, Brunswick, OH (US); Rick A. Hamilton, II, Charlottesville, VA (US); Kerrie L. Holley, Montara, CA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/344,092

(22) Filed: Jan. 5, 2012

(65) Prior Publication Data

US 2013/0179232 A1    Jul. 11, 2013

(51) Int. Cl.
   *G06Q 10/00*   (2012.01)
   *G06Q 10/04*   (2012.01)

(52) U.S. Cl.
   CPC .................... *G06Q 10/04* (2013.01)

(58) Field of Classification Search
   CPC .......................................... G06Q 10/00–50/00
   USPC ................................. 705/7.11–7.42
   See application file for complete search history.

(56) References Cited

U.S. PATENT DOCUMENTS

| | | | |
|---|---|---|---|
| 6,529,948 B1 * | 3/2003 | Bowman-Amuah | G06F 9/4435 709/217 |
| 7,376,579 B2 | 5/2008 | Hack et al. | |
| 7,613,625 B2 * | 11/2009 | Heinrich | 705/7.28 |
| 7,720,835 B2 * | 5/2010 | Ward et al. | 707/710 |
| 7,809,597 B2 | 10/2010 | Das et al. | |
| 7,831,453 B2 | 11/2010 | Das et al. | |
| 7,844,602 B2 * | 11/2010 | Katwala et al. | 707/723 |
| 7,908,305 B2 | 3/2011 | Baxter et al. | |
| 2002/0049621 A1 * | 4/2002 | Bruce | G06Q 10/06 705/7.26 |
| 2003/0023686 A1 | 1/2003 | Beams et al. | |
| 2003/0046130 A1 * | 3/2003 | Golightly et al. | 705/7 |
| 2004/0073616 A1 * | 4/2004 | Fellenstein | G06Q 10/107 709/206 |
| 2005/0096922 A1 * | 5/2005 | Huberman et al. | 705/1 |

(Continued)

FOREIGN PATENT DOCUMENTS

CN    101069178 A    11/2007

OTHER PUBLICATIONS

Lin, Ching-Torng, Hero Chiu, and Po-Young Chu. "Agility index in the supply chain." International Journal of Production Economics 100.2 (2006): 285-299.*

(Continued)

*Primary Examiner* — Alan S Miller
(74) *Attorney, Agent, or Firm* — William H. Hartwell; Hunter E. Webb; Keohane & D'Alessandro PLLC (57) ABSTRACT

Embodiments of the present invention provide an approach for determining and/or enhancing an organization's agility across one or more computing domains. Among other things, embodiments of the present invention parse and mine organizational documents for relevant data, calculate and weight business agility scores, optimize domain elements to ensure optimal outcomes for customers, and/or provide organization agility information for transfer to consultants or the like. It is understood that these functions may be used independently or in conjunction with each other depending on the scope of improvement desired for a particular organization.

19 Claims, 7 Drawing Sheets

(56) References Cited

U.S. PATENT DOCUMENTS

| | | | |
|---|---|---|---|
| 2005/0222893 A1* | 10/2005 | Kasravi et al. | 705/10 |
| 2006/0161444 A1* | 7/2006 | Lubrecht et al. | 705/1 |
| 2007/0100950 A1* | 5/2007 | Bornstein et al. | 709/206 |
| 2008/0091676 A1* | 4/2008 | Zwilling et al. | 707/6 |
| 2008/0133488 A1* | 6/2008 | Bandaru et al. | 707/3 |
| 2008/0177593 A1* | 7/2008 | Clayton et al. | 705/7 |
| 2008/0235079 A1* | 9/2008 | Barel et al. | 705/10 |
| 2010/0023360 A1 | 1/2010 | Nadhan | |
| 2010/0145940 A1* | 6/2010 | Chen | G06F 17/30864 707/736 |
| 2010/0251205 A1* | 9/2010 | Antoun | G06Q 10/04 717/102 |
| 2011/0282704 A1* | 11/2011 | Graeber et al. | 705/7.11 |
| 2012/0173443 A1* | 7/2012 | Gerashchenko et al. | 705/317 |

OTHER PUBLICATIONS

Lin, Ching-Torng, Hero Chiu, and Yi-Hong Tseng. "Agility evaluation using fuzzy logic." International Journal of Production Economics 101.2 (2006): 353-368.*

Yaghoubi, Nour-Mohammad, Baqer Kord, and Omolbanin Azadikhah. "Assessing Organizational Agility via Fuzzy Logic." International Business Research 4.3 (2011).*

Ganguly, Anirban, Roshanak Nilchiani, and John V. Farr. "Evaluating agility in corporate enterprises." International Journal of Production Economics 118.2 (2009): 410-423.*

Arteta, B. M., and R. E. Giachetti. "A measure of agility as the complexity of the enterprise system." Robotics and Computer-Integrated Manufacturing 20.6 (2004): 495-503.*

Sherehiy, Bohdana, Waldemar Karwowski, and John K. Layer. "A review of enterprise agility: Concepts, frameworks, and attributes." International Journal of industrial ergonomics 37.5 (2007): 445-460.*

Tsourveloudis, Nikos C., and Kimon P. Valavanis. "On the measurement of enterprise agility." Journal of Intelligent and Robotic Systems 33.3 (2002): 329-342.*

Spangler, Scott, et al. "COBRA—Mining web for corporate brand and reputation analysis." Web Intelligence and Agent Systems: An International Journal 7.3 (2009): 243-254.*

Behal, Amit, et al. "COBRA—A Visualization Solution to Monitor and Analyze Consumer Generated Medias." Symposium on Human Interface. Springer Berlin Heidelberg, 2009.*

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 19 pages.

Xiao Qi Zhi, "Information Materials for IDS", CN Office Action Dated Sep. 30, 2015, 4 pages.

* cited by examiner

ORGANIZATIONAL AGILITY DETERMINATION ACROSS MULTIPLE COMPUTING DOMAINS

TECHNICAL FIELD

Embodiments of the present invention relate to organizational agility. Specifically, embodiments of the present invention relate to computer-implemented organizational agility determination across one or more computing domains.

BACKGROUND

Organizational agility is the collective measure of an organization's ability to achieve its desired outcomes, be predictive, flexible, and responsive, and launch new initiatives. Furthermore, organizational agility encompasses an ability of an organization to adapt rapidly, effectively, and cost efficiently in response to changes in the economic environment. Still yet, organizational agility gauges an ability of the organization to quickly adjust to, and take advantage of, emerging opportunities.

An organization that is considered to be agile strives to make change a routine part of organizational life in order to reduce or eliminate the organizational issues that may suppress attempts to adapt to new markets and environments. Because change may be perpetual, an agile organization is able to quickly adjust to, and take advantage of, emerging opportunities. An organization that is agile may be viewed as an integral component of a larger system whose activities produce a ripple effect of change both within the enterprise itself and the broader system. Challenges may exist, however, in accurately and efficiently measuring an organization's agility. Without such a measure, it may be difficult to determine where improvement is needed.

SUMMARY

Embodiments of the present invention provide an approach for determining and/or enhancing an organization's agility across one or more computing domains. Among other things, embodiments of the present invention parse and mine organizational documents for relevant data, calculate and weight business agility scores, optimize domain elements to ensure optimal outcomes for customers, and/or provide organization agility information for transfer to consultants or the like. It is understood that these functions may be used independently or in conjunction with each other depending on the scope of improvement desired for a particular organization.

A first aspect of the present invention provides a computer-implemented method for determining organizational agility of an organization across multiple computing domains, comprising: receiving a set of organizational documents associated with an organization in a computer memory medium; analyzing the set of organizational documents for a set of keywords that is indicative of the organizational agility of the organization; calculating a set of agility scores based on the analyzing using a set of agility computation rules; weighting the set of agility scores based on at least one of the following: a set of industry vertical factors associated with the organization, a size of the organization, a geographic region associated with the organization, and a competitive position associated with the organization; and providing output based on the calculating and the weighting.

A second aspect of the present invention provides a system for determining organizational agility of an organization across multiple computing domains, comprising: a memory medium comprising instructions; a bus coupled to the memory medium; and a processor coupled to the bus that when executing the instructions causes the system to: receive a set of organizational documents associated with an organization in a computer memory medium; analyze the set of organizational documents for a set of keywords that is indicative of the organizational agility of the organization; calculate a set of agility scores based on the analysis using a set of agility computation rules; weight the set of agility scores based on at least one of the following: a set of industry vertical factors associated with the organization, a size of the organization, a geographic region associated with the organization, and a competitive position associated with the organization; and provide output based on the calculation and the weighting.

A third aspect of the present invention provides a computer program product for determining organizational agility of an organization across multiple computing domains, the computer program product comprising a computer readable storage media, and program instructions stored on the computer readable storage media, to: receive a set of organizational documents associated with an organization in a computer memory medium; analyze the set of organizational documents for a set of keywords that is indicative of the organizational agility of the organization; calculate a set of agility scores based on the analysis using a set of agility computation rules; weight the set of agility scores based on at least one of the following: a set of industry vertical factors associated with the organization, a size of the organization, a geographic region associated with the organization, and a competitive position associated with the organization; and provide output based on the calculation and the weighting.

A fourth aspect of the present invention provides a method for deploying a system for determining organizational agility of an organization across multiple computing domains, comprising: providing a computer infrastructure being operable to: receive a set of organizational documents associated with an organization in a computer memory medium; analyze the set of organizational documents for a set of keywords that is indicative of the organizational agility of the organization; calculate a set of agility scores based on the analysis using a set of agility computation rules; weight the set of agility scores based on at least one of the following: a set of industry vertical factors associated with the organization, a size of the organization, a geographic region associated with the organization, and a competitive position associated with the organization; and provide output based on the calculation and the weighting.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for determining and/or enhancing an organization's agility across one or more computing domains. Among other things, embodiments of the present invention parse and mine organizational documents for relevant data, calculate and weight business agility scores, optimize domain elements to ensure optimal outcomes for customers, and/or provide organization agility information for transfer to consultants or the like. It is understood that these functions may be used independently or in conjunction with each other depending on the scope of improvement desired for a particular organization.

Figure 1:
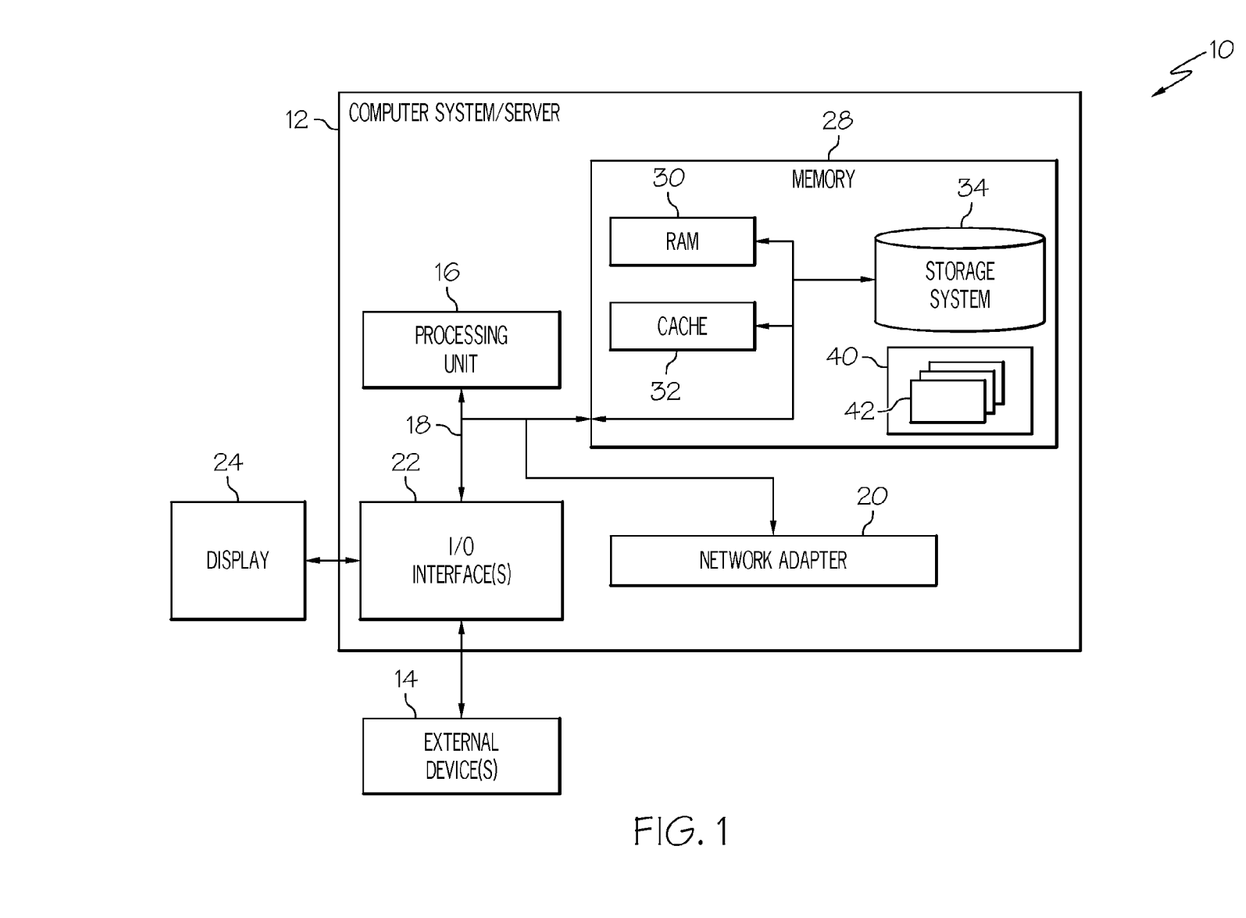
FIG. 1 depicts a computing node according to an embodiment of the present invention.

Referring now to FIG. 1, a schematic of an example of a computing node is shown. Computing node 10 is only one example of a suitable structure computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable structure for use with computer system/server 12 include, but are not limited to, personal computer systems, server computer systems, thin clients, thick clients, handheld or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable structure instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband). Such a propagated signal may take a variety of forms including electromagnetic, optical, or any suitable structure combination thereof. A computer readable signal medium can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable structure combination of the foregoing.

Organization agility determination program/utility 40, having a set (at least one) of program modules 42, may be stored in memory 28 by way of example, and not limitation, as well as an operating system, one or more application programs, other program modules, and program data. In general, organization agility determination program 40 performs the function of the present invention as described herein.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

As indicated above, embodiments of the present invention provide an approach for determining the business agility of an organization that may span multiple computing domains. One type of enterprise architecture that supports agility is a no-hierarchical organization without a single point of control where individuals may function relatively autonomously. Roles and responsibilities may not be predetermined, but, rather, may emerge from individuals' self-organizing activities and may be constantly in flux. Similarly, projects may be generated everywhere in the enterprise, sometimes even from outside affiliates. Along these lines, key decisions may be made collaboratively or on the spot. Because of this, knowledge, power, and intelligence may be spread through the enterprise, making it uniquely capable of quickly recovering and adapting to the loss of any key enterprise component.

One focus of agility determination methods is to address the issues of complexity, uncertainty, and dynamic goals by making planning and execution of workloads in parallel rather than in sequence. Such workload execution may assist in eliminating unnecessary planning activities and the resulting unnecessary work. Agility methods integrate planning with execution allowing an organization to "search" for an optimal ordering of work tasks and to adjust to changing requirements. Some causes of disarray on a project include incomplete understanding of project components, incomplete understanding of component interactions, and changing requirements. Moreover, requirements for a project may change over time as a greater understanding of the project components unfolds. Requirements may also change due to changing needs and wants of the parties involved. An "agile" approach or organizational philosophy allows a team or organization to implement successful projects quickly by only focusing on a small set of details in any change iteration. This is in contrast to non-agile approaches in which all the details necessary for completion may be given equal priority.

Along these lines, the embodiments of the present invention provide an approach to automatically derive a business/organizational agility score of an organization across multiple computing domains. Specifically, the approach described herein provides a system to obtain corporate documents (e.g., electronic), analyze those documents, and calculate a business agility score for the organization. Document consumption may automatically detect or highlight governance levels and/or organizational culture. The documents may also be used to fully calculate the score or assist a consultant by providing a possible range of scores thereby reducing human intervention times. Furthermore, the approach described herein provides algorithmic weighting based on standards for multiple areas such as (among others): industry vertical factors, organizational size, geographic region, and/or competitive positioning associated with an organization. Use of such automated tuning allows business agility scores to accurately reflect the priorities and environments of a company within a particular business ecosystem.

Still yet, the approach described herein may utilize automatic document discovery methods and analysis to select documents of interest and automatically transfer and highlight said documents to agility consultants. This method may automatically transfer white papers, action plans, business plans, etc. to consultants. In one embodiment, sensitive and confidential information may automatically be detected and transferred to the corporation's legal department for review prior to release. The automatic document detection and transfer of pertinent information may assist consultants in providing the most accurate recommendations without requiring consultants to read all corporate documentation.

Figure 2:
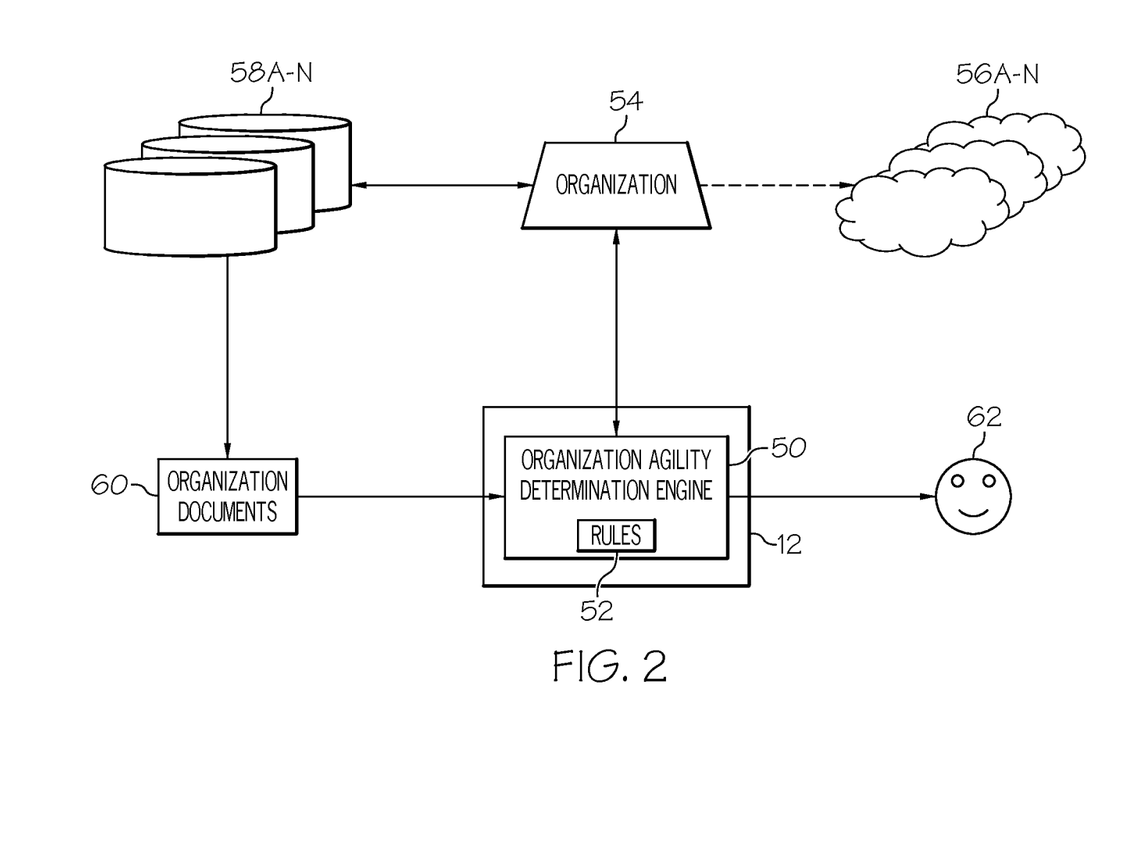
FIG. 2 depicts a system diagram according to an embodiment of the present invention.

Referring now to FIG. 2, a system diagram capable of implementing the functionality discussed herein according to an embodiment of the present invention is shown. It is understood that the teachings recited herein may be practiced within any type of networked computing environment (e.g., a cloud computing environment, or a grid computing environment). A stand-alone computer system/server 12 is shown in FIGS. 1 and 2 for illustrative purposes only. In the event the teachings recited herein are practiced in a networked computing environment, each client need not have a business agility determination engine (engine 50). Rather, engine 50 could be loaded on a server or server-capable device that communicates (e.g., wirelessly) with the clients to provide device protection therefor.

Regardless, as depicted, engine 50 is shown within computer system/server 12. In general, engine 50 can be implemented as organization agility determination program/utility 40 on computer system 12 of FIG. 1 and can enable the functions recited herein. As further shown, engine 50 (in one embodiment) comprises a rules and/or computational engine that processes a set (at least one) of rules 52 and/or provides confidence-based computing resource allocation hereunder.

Along these lines, engine 50 may perform multiple functions similar to a general-purpose computer. Specifically, among other functions, engine 50 may (among other things): receive a set of organizational documents 60 (e.g., electronically from one or more computer storage devices 58A-N) associated with an organization 54 (e.g., across one or more computing domains 56A-N) in a computer memory medium; analyze the set of organizational documents 50 for a set of keywords that is indicative of the organizational agility of the organization 54; calculate a set of agility scores based on the analyzing using a set of agility computation rules; weight the set of agility scores based on at least one of the following: a set of industry vertical factors associated with the organization 54, a size of the organization 54, a geographic region associated with the organization 54, and a competitive position associated with the organization 54; provide output (e.g., to a user/consultant 62) based on the calculating and weighting; determine a governance of the organization 54 based on the set of keywords; determine a management structure of the organization 54 based on the set of keywords; and/or identify one or more areas where information associated with the organization agility was lacking.

Illustrative Implementation

This section describes one illustrative approach for implementing the teachings and/or functions recited herein. It is understood that this is one possible way of implementing the embodiments of the present invention and that other alternatives could exist.

I. Automated Business Agility Calculation Method:

This method automatically derives a business agility score of an organization across multiple computing domains. Details are disclosed to obtain corporate documents, analyze those documents, and calculate, in part or in whole, the business agility score for the organization. Document analysis may automatically detect or highlight governance levels and organizational culture. The obtained documents may be used to fully calculate the score or assist a consultant by providing a possible range of scores, thereby reducing human intervention times.

Figure 3:
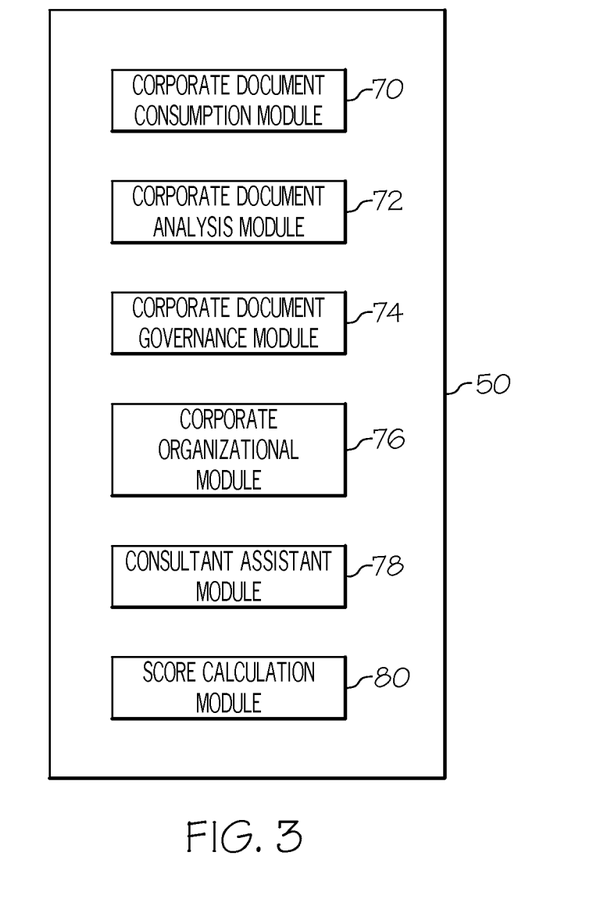
FIG. 3 depicts a diagram of the organization agility determination engine/program according to embodiment of the present invention.

Referring now to FIG. 3 an illustrative diagram of engine 50 is shown. The modules shown in FIG. 3 generally outline logical functions contained within a computer-assisted logical implementation of the embodiments of the present invention. Such modules may be broken out into separate computer program functions, or they may be contained within a single (or smaller number of) computer program(s).

Corporate Document Consumption Module 70: This module acquires corporate documents for analysis. Several embodiments for consumption/location are possible. In one embodiment, a web crawler is used to fetch documents from the corporate intranet and place them in a relational datastore. In an alternate embodiment, the consultant selects a subset of documents for consumption and provides them to the consumption module through a computerized, potentially web-enabled, document repository interface. In yet another embodiment, the organization's email documents are provided to this module for consumption. In the preferred email consumption embodiment, a specialized program connects to the corporate mail servers and extracts relevant historical correspondence. If the email server does not support historical document retention, a different method may be used in which a program is installed atop the mail server to record correspondence for future analysis. These documents may be automatically limited to include only those in senior or upper management, in such situations where this limitation may yield better results. This module, based on its keyword analysis, will assign positive scores to good practices and negative scores to bad practices. Note that such keyword analysis and score assignment may occur either in the consumption module or in the analysis module below.

Corporate Document Analysis Module 72: This module calculates the current business agility for an organization. Documents acquired by the consumer module described above are analyzed for a set of keywords and keyword counts. These keywords are then fed into known rules-based engines to ascertain a likely business agility score. Additionally, text analytics engines such as that provided by IBM® Corporate Brand and Reputation Analysis (COBRA) (IBM and related terms are trademarks of International Business Machines Corp. in the United States and/or other countries) may be used to discern trends across disparate documents. This trend analysis is used to assist in calculation of the agility score. COBRA leverages advanced and deep text and data analytics techniques to mine wide range of social media content, such as blogs, news, forums, and corporate internal information to derive customer and enterprise insights, such as brand and reputation insights, risk and compliance monitoring, market and competitive insights.

Corporate Document Governance Module 74: A special analysis may be used to calculate governance within an organization. For example, specific keywords may be searched through the consumed documents to determine the amount of governance within an organization. Additionally, this module may automatically ingest employee titles through either email scans, document scans, or access to the employee directory. Employee title analysis may be used to discern the amount of governance in an organization.

Corporate Organizational Module 76: This module ingests organization information to determine how "flat" an organization is. One part of being agile may include having flattened management structure. This module may consume relevant information from structured corporate sources (e.g., published organizational charts or from unstructured sources, email scans, looking for words such as "manager" to infer such a structure, etc.). In one embodiment, this module may link to a corporate directory from which it may calculate the organizational structure and assign a score based on the structure.

Consultant Assistance Module 78: This optional module may be 40 invoked after the previous modules and informs the consultant as to which areas it was unable to obtain information. At that point, the consultant may conduct focused interviews for the areas of need. Once those interviews are done, the consultant may generate a score for the needed areas as is presently known. Upon completion of calculation, the consultant will provide scores to the score calculation module.

Score Calculation Module 80: This module calculates the overall agility score for an organization based on the analysis provided by the previous modules and the input from the consultant.

Figure 4:
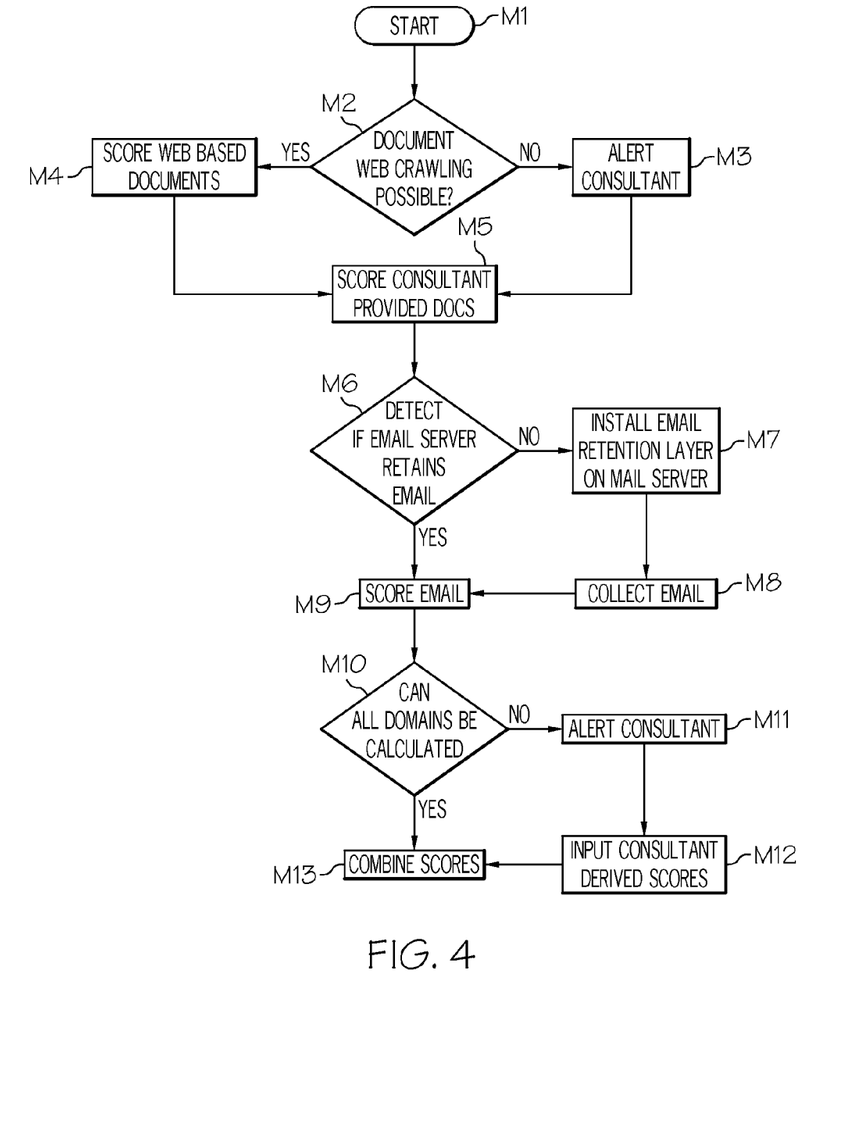
FIG. 4 depicts a method flow diagram according to an embodiment of the present invention.

Referring now to FIG. 4, a flow diagram illustrating the automated business agility calculation method discussed above is shown. As depicted, the process is started in step M1. In step M2, it is determined whether document web crawling is possible (e.g., by corporate document consumption module 70). If not, a consultant can be alerted in step M3. If so, web-based documents are scored in step M4 (e.g., by corporate document analysis module 72). In either event, consultant provided documents can be scored in step M5, and it is determined in step M6 if the applicable email server retains emails (e.g., by corporate document governance module 74). If not, an email retention layer is installed in step M7, and email is collected in step M8. Then, the retained email can be scored in step M9. In step M10, it is determined whether all domains can be calculated. If not, the consultant is alerted in step M11, and input is received from the consultant in the form of derived scores in step M12. Once all domains can be calculated and/or consultant scores are received, they will be combined in step M13 (e.g., by score calculation module 80).

II. Automatic Weighting of Domains and Domain Elements to Optimize Client/Customer Organizational Environment:

This method automatically weights (i.e., tunes business agility domain elements to optimize outcomes for specific clients/customers). This method provides algorithmic weighting based on standards for four distinct areas: industry vertical factors, organizational size, geographic region, and competitive positioning. Depending on embodiment, any or all of these four areas may be used to optimize weighting. Use of such automated tuning allows business agility scores to accurately reflect the priorities and environments of a company within a particular business ecosystem.

Industry verticals factors: A vertical market is a group of similar businesses and customers that engage in trade based on specific and specialized needs. Based on known information about popular industry verticals, this invention may weight specific agility enhancements above others to provide a competitive advantage.

Organizational size: The size of a specific organization changes the weighting of various improvement areas for business agility. Large organizations of common size may generally need to focus improvements in one area, while smaller corporations may benefit by focusing on other improvement realms. Based on organization size, this invention may weight various factors differently.

Geographic region: The geographic region or regions of a corporation may modify the weightings for various improvement areas. The geographic region may be automatically calculated by the document ingestion modules described above. For example, different agility areas may be of different values depending on the region. Additionally, if some improvements require government compliance/oversight, improvement order may be modified, depending on geography, Competitive position: The organization's competitive position may be used to modify the weighting for specific domain elements. For example, if an organization has a competitive advantage in one product or services area, the weighting for that area's improvement need may be modified vis-à-vis a different domain in which they are at a disadvantage compared to competitors.

Figure 5:
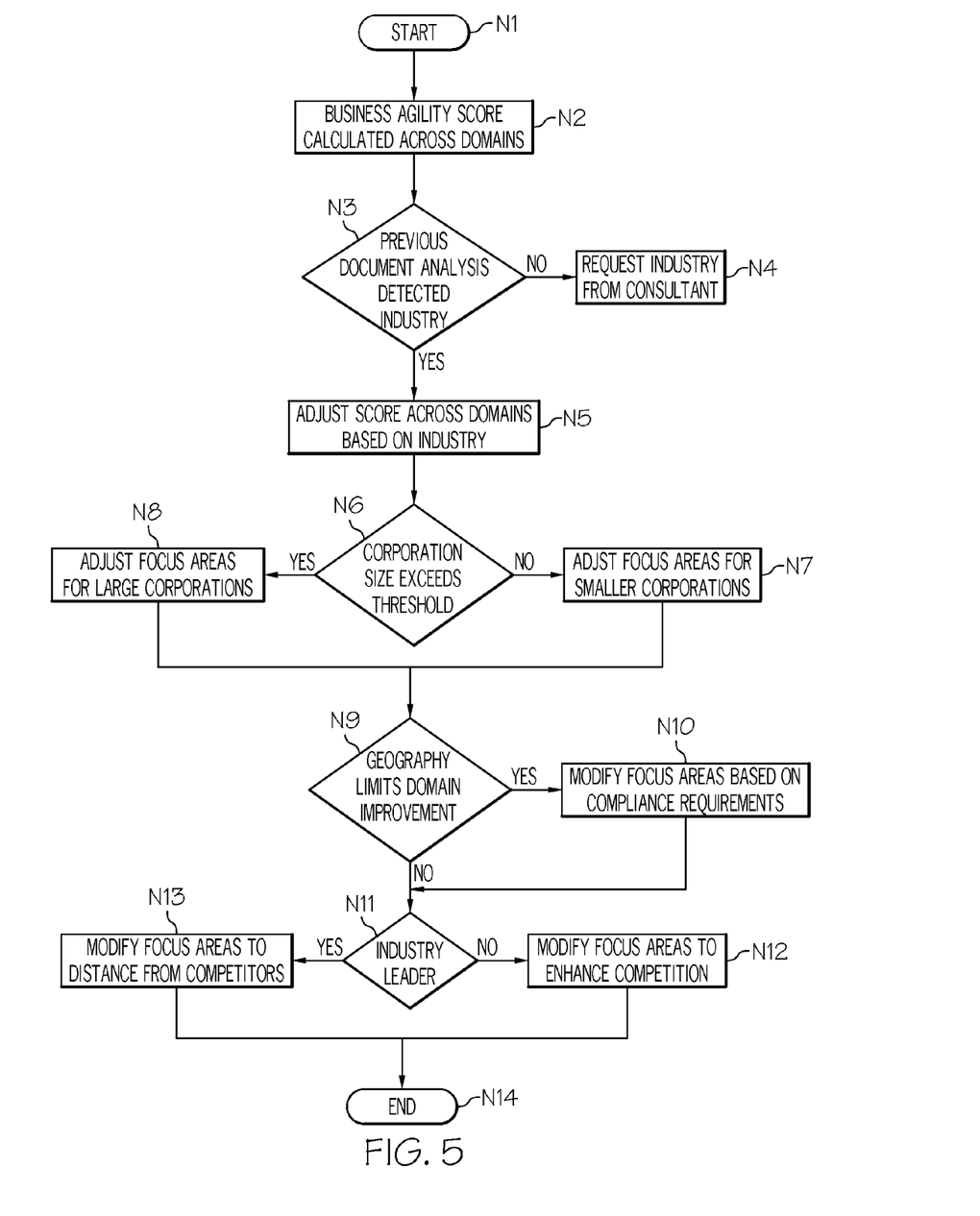
FIG. 5 depicts another method flow diagram according to an embodiment of the present invention.

Referring now to FIG. 5, a flow diagram illustrating the automatic weighting of domains and domain elements to optimize clients/customers is shown. The process is started in step N1 and in step N2, a business/organizational agility score is determined/calculated. In step N3, it is determined whether a previous document analysis detected an applicable business industry. If not, identification of the industry is requested from a consultant in step N4. In step N5, scores are adjusted across the domains based on the industry. In step N6, it is determined whether a size of the corporate exceeds a predetermined threshold. If so, focus areas are adjusted to smaller companies in step N7. If not, focus areas are adjusted for large corporations in step N8. In either event, it is thereafter determined whether geography limits domain improvement in step N9. If so, focus areas are modified based on applicable compliance requirements in step N10. If not, it is determined whether the organization is deemed to be an industry leader in step N11 (e.g., based on independent business rankings). If so, focus areas can be modified to enhance competition in step N12. If so, focus areas can be enhanced to distance organization from competitors in step N13. In either case, the process can then be ended in step N14.

III. Consultant Agility Information Transfer:

This method uses automatic document discovery methods and analysis to select documents of interest, and will automatically transfer and optionally highlight the documents to agility consultants or organizational staff. This method may automatically transfer white papers, action plans, business plans, etc., to consultants. In one embodiment, sensitive and confidential information may automatically be detected and transferred to the corporation's legal department for review prior to release. The automatic document detection and transfer of pertinent information may assist consultants in providing the most accurate recommendations without requiring consultants to read all corporate documentation.

Document Discovery: During the document discovery portions of these documents, invention specific documents are flagged for review by business agility consultants. Documents may be flagged using many methods. For example, if the document contains a specific keyword a specified number of times, the document may be automatically flagged. In another scenario, if the same document is referenced by other documents a specific number of times, the importance of that document may be determined to be above a threshold and require manual review.

Legal Document Review: In some embodiments before a document is packaged for a consultant, it may be sent to the organization's legal team for review. This may be used to prevent the escape of trade secrets, salary information, or other sensitive information. This process may be automated such that the appointed legal members are sent a URL. Upon logging in, they are presented with each document and may approve, reject, or redact portions of that document before document transfer.

Document Transfer: This method bundles and transfers the documents to the consultant teams for further review. Alternatively, they may be sent to organizational staff directly. The documents may be bundled by automatically determined functional area (using IBM COBRA or similar technologies) or by document relationship through link analysis. The document transfer mechanism may have many embodiments. In one embodiment, the documents are sent to a secure store and the consultant is required to access them and download them through a secure mechanism. In other embodiments, all documents may be placed into a secure web store and the consultant may only access them through a SSL connection via a web browser.

Figure 6:
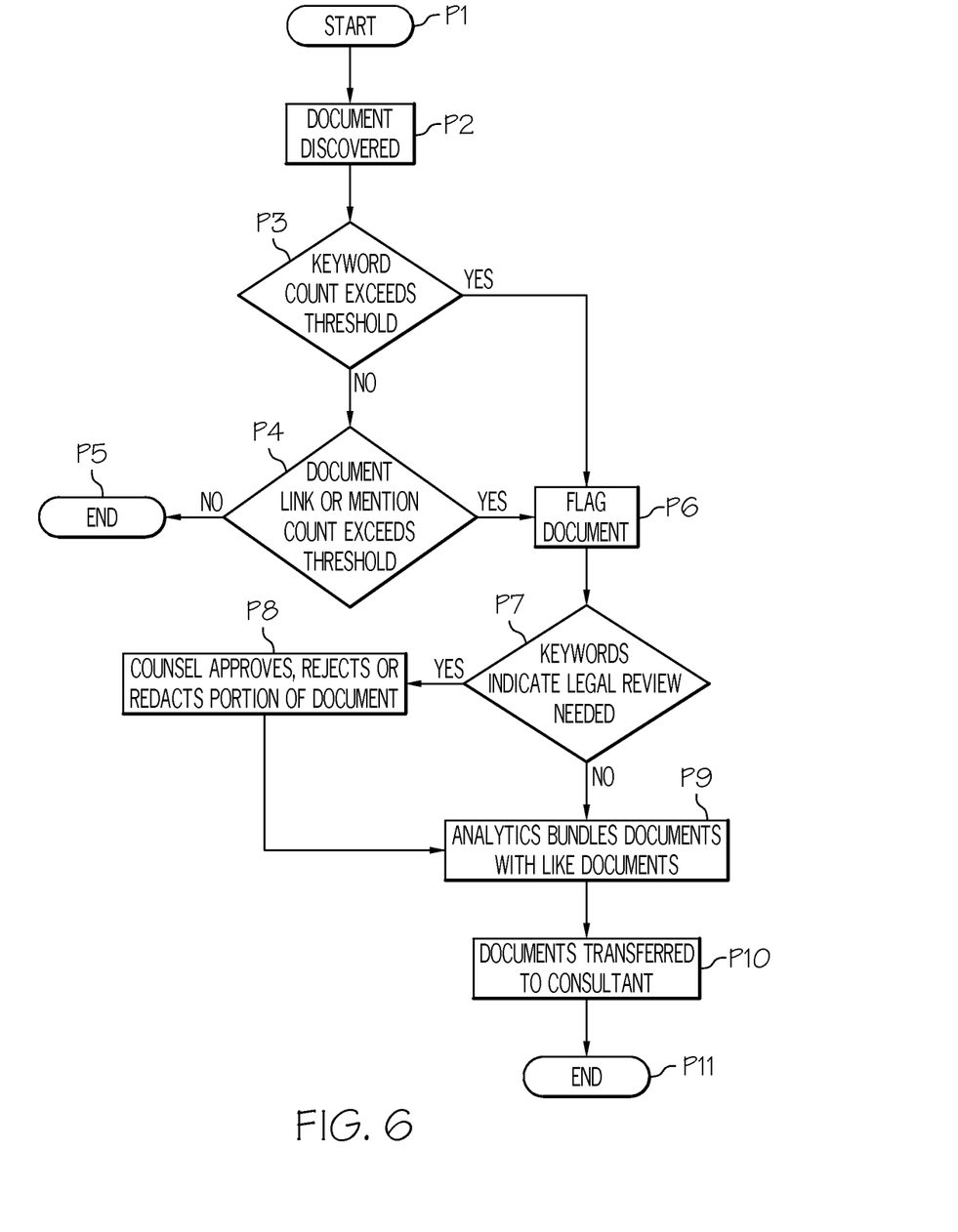
FIG. 6 depicts another method flow diagram according to an embodiment of the present invention.

Referring now to FIG. 6, a flow diagram illustrating the consultant agility information transfer approach described above is shown. As depicted, the process is started in step P1 and in step P2, a document is discovered. In step P3, it is determined whether a keyword count exceeds a predetermined threshold. If so, the document is flagged in step P6. If not, it is determined in Step P4 whether a document link, or "mention count" (e.g., number of occurrences' of a particular keyword) exceeds a predetermined threshold. If not, the process ends in step P5. If so, the document is flagged in step P6. In step P7, it is determined whether keywords indicate that a legal review of any document is needed. If so, counsel (or other party) approves, rejects, or redacts portions of the documents in step P8. Then, in step P9, the system bundles documents with similar documents. The bundles are transferred to the consultant (or other party) in step P10 (e.g., by consultant assistant module 78) before the process is ended in step P11.

Figure 7:
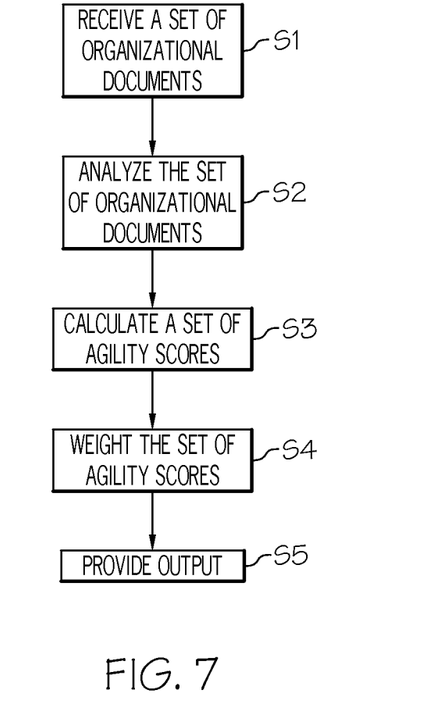
FIG. 7 depicts another method flow diagram according to an embodiment of the present invention.

Referring now to FIG. 7, a method flow diagram according to an embodiment of the present invention is shown. In step S1, a set of organizational documents associated with an organization is received in a computer memory medium. In step S2, the set of organizational documents is analyzed for a set of keywords that is indicative of the business agility of the organization. In step S3, a set of agility scores is calculated based on the analyzing using a set of agility computation rules. In step S4, the set of agility scores is weighted based on at least one of the following: a set of industry vertical factors associated with the organization, a size of the organization, a geographic region associated with the organization, and a competitive position associated with the organization. In step S5, output is provided based on the calculating and weighting.

Illustrative Pseudo Code

This section comprises illustrative pseudo code that performs some of the analysis functions set forth above (e.g., similar to COBRA).

```
/* This java class implements a table, where each row of the table
   represents a positive antecedent of the generated rule
*/
    public class RuleTable extends AbstractInfo implements TableInfo
    { public
        TextClustering tc = null; // contains the feature space for the
document corpus and two categories "recent" and "Other".
        RuleSet rs = null;
        HashMap featMap = null;
        int fSize = 200; // number of features to use during rule generation.
//The creation method takes in a feature space and data partition
(TextClustering) and builds a rule based classifier based on this
information (rule induction)
    public RuleTable(TextClustering t) {
        tc = t;
        TMCLRuleBased trb = new TMCLRuleBased (tc,
tc.attribNames.length, tc.ndata, tc.nclusters); //rule induction engine
        selectFeatures( );
        registerData(trb);
        System.out.println("About to build classifier");
        trb.buildClassifier( ); //perform rule induction
        rs = com.ibm.cv.text.metric.UtilM.getRuleSet(trb);
        try { // remove any rules that are not generated for the "recent"
category
            for (int i=rs.size( )-1; i>=0; i--) {
                Rule r = rs.getRule(i);
                if (r.getCategory( ).equals("recent")) continue;
                rs.removeRule(i);
            }
        } catch (Exception e) {e.printStackTrace( );}
    }
// Select the best features to use for rule induction
    protected void selectFeatures( )
        {
                FeatureSelection fs = new FeatureSelection(tc);
                featMap = new HashMap( );
                featMap = fs.selectFeatures(fSize, featMap);
                fSize = (short) featMap.size( );
                System.out.println("fSize = " + fSize);
        }
// Register the data to use for rule induction
    protected void registerData(TMCLRuleBased trb)
    {
        short count = 0;
        if (tc.ndata<10000000) { // if data set is too large, then sample.
            for (int i=0; i<tc.ndata; i++)
            {
                trb.registerID(i);
                //trb.registerClass(count, (short)
                tc.smembership[i]);
            }
        }
        else {
            float percentage = 10000.0F/tc.ndata;
            int pos =
com.ibm.cv.Util.findPosition("recent",tc.clusterNames);
            for (int i=0; i<tc.ndata; i++) {
                if (tc.smembership[i]==pos) trb.registerID(i);
                if (Math.random( )<percentage) trb.registerID(i);
            }
        }
        trb.finishRegistration( );
    }
// The remaining methods are access methods for information contained
in the rule table.
    public int getRowCount( ) {
        return rs.size( );
    }
    public int getColumnCount( ) {
        return 3;
    }
    public String getColumnName(int columnIndex) {
        switch (columnIndex) {
            case 0:
                return "Category";
            case 1:
                return "Rule";
            case 2:
                return "Confidence";
        }
        return null;
    }
    public Class getColumnClass(int columnIndex) {
        return String.class;
    }
// Returns the rule antecedent (and other information) for each relevant
rule.
    public Object getValueAt(int rowIndex,
                              int columnIndex) {
        Rule r = null;
        try {
            r = rs.getRule(rowIndex);
            switch (columnIndex) {
                case 0:
                    return r.getCategory( );
                case 1:
                    String rc ="";
                    for (int i=0; i<r.getAntecedentSize( );i++) {
                        if (i!=0) rc = rc+" & ";
                        rc= rc+ r.getAntecedent(i).asString( );
                    }
                    return rc;
                case 2:
                    return new Float(r.getConfidence( ));
            }
        } catch (Exception e) {
            e.printStackTrace( );
            return null;
        }
        return null;
    }
}
```

While shown and described herein as an organization agility determination system, it is understood that the invention further provides various alternative embodiments. For example, in one embodiment, the invention provides a computer-readable/useable medium that includes computer program code to enable a computer infrastructure to provide organization agility determination functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable structure storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide organization agility determination functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for organization agility determination. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable structure for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for determining organizational agility of an organization across multiple computing domains, comprising:
   extracting, from one or more mail servers of the organization, a set of relevant historical organizational e-mail documents associated with an organization in a computer memory medium;
   fetching a set of electronic documents from an intranet of the organization via a web crawler;
   analyzing, by a computer system, the set of relevant historical organizational e-mail documents and the set of electronic documents by parsing the set of relevant historical organizational e-mail documents and the set of electronic documents for a set of keywords that is indicative of the organizational agility of the organization, each of the set of keywords having an associated score, the organizational agility based on an amount of governance within the organization;
   determining trends across disparate documents in the set of relevant historical organizational e-mail documents and the set of electronic documents combined with customer and enterprise insights mined from social media content using deep text and data analytics;
   calculating, by the computer system, a set of agility scores based on the trends and the analyzing of scores associated with the set of keywords using a set of agility computation rules, wherein a higher agility score is calculated in the case that the set of keywords indicate a lower amount of governance;
   weighting, by the computer system, the set of agility scores based on a geographic region associated with the organization;
   providing output based on the calculating and the weighting; and
   altering work tasks in a workload to an ordering that is optimal for the organization based on the weighted agility scores.

2. The computer-implemented method of claim 1, further comprising determining, by the computer system, a set of actions to be taken based on the output.

3. The computer-implemented method of claim 1, the analyzing further comprising determining a management structure of the organization based on the set of keywords to determine a number of hierarchical layers of the management structure, the set of agility scores being further based on the management structure, wherein a higher agility score is calculated in the case that the management structure has a lower number of hierarchical layers.

4. The computer-implemented method of claim 1, further comprising identifying, by the computer system, one or more areas where information associated with the organization agility was lacking.

5. The computer-implemented method of claim 1, the weighting of the set of agility scores being further based on: a set of industry vertical factors pertaining to a set of business needs of the organization, a size of the organization, and a competitive position associated with the organization.

6. The computer-implemented method of claim 1, the output comprising a set of flagged documents that have an importance in the analyzing that exceeds a threshold; a set of legal documents, and a set of recommendations associated with the weighted set of agility scores.

7. A system for determining organizational agility of an organization across multiple computing domains, comprising:
- a memory medium comprising instructions;
- a bus coupled to the memory medium; and a processor coupled to the bus that when executing the instructions causes the system to:
- extract, from one or more mail servers of the organization, a set of relevant historical organizational e-mail documents associated with an organization in a computer memory medium;
- fetch a set of electronic documents from an intranet of the organization via a web crawler;
- analyze the set of relevant historical organizational e-mail documents and the set of electronic documents by parsing the set of relevant historical organizational e-mail documents and the set of electronic documents for a set of keywords that is indicative of the organizational agility of the organization, each of the set of keywords having an associated score, the organizational agility based on an amount of governance within the organization;
- determine trends across disparate documents in the set of relevant historical organizational e-mail documents and the set of electronic documents combined with customer and enterprise insights mined from social media content using deep text and data analytics;
- calculate a set of agility scores based on the analysis of scores associated with the set of keywords using a set of agility computation rules, wherein a higher agility score is calculated in the case that the set of keywords indicate a lower amount of governance;
- weight the set of agility scores based on a geographic region associated with the organization;
- provide output based on the calculation and the weighting; and
- alter work tasks in a workload to an ordering that is optimal for the organization based on the weighted agility scores.

8. The system of claim 7, the memory medium further comprising instructions for causing the system to determine a set of actions to be taken based on the output.

9. The system of claim 7, the memory medium further comprising instructions for causing the system to determine a management structure of the organization based on the set of keywords to determine a number of hierarchical layers of the management structure, the set of agility scores being further based on the management structure, wherein a higher agility score is calculated in the case that the management structure has a lower number of hierarchical layers.

10. The system of claim 7, the memory medium further comprising instructions for causing the system to identify one or more areas where information associated with the organization agility was lacking.

11. The system of claim 7, the weighting of the set of agility scores being further based on: a set of industry vertical factors pertaining to a set of business needs of the organization, a size of the organization, and a competitive position associated with the organization.

12. The system of claim 7, the output comprising a set of flagged documents that have an importance in the analyzing that exceeds a threshold; a set of legal documents, and a set of recommendations associated with the weighted set of agility scores.

13. A system including a computer program product for determining organizational agility of an organization across multiple computing domains, the computer program product comprising a computer readable storage device, wherein the computer readable storage device is not a transitory signal, and program instructions stored on the computer readable storage media, causing the system to:
- extract, from one or more mail servers of the organization, a set of relevant historical organizational e-mail documents associated with an organization in a computer memory medium;
- fetch a set of electronic documents from an intranet of the organization via a web crawler;
- analyze the set of relevant historical organizational e-mail documents and the set of electronic documents by parsing the set of relevant historical organizational e-mail documents and the set of electronic documents for a set of keywords that is indicative of the organizational agility of the organization, each of the set of keywords having an associated score, the organizational agility based on an amount of governance within the organization;
- determine trends across disparate documents in the set of relevant historical organizational e-mail documents and the set of electronic documents combined with customer and enterprise insights mined from social media content using deep text and data analytics;
- calculate a set of agility scores based on the analysis of scores associated with the set of keywords using a set of agility computation rules, wherein a higher agility score is calculated in the case that the set of keywords indicate a lower amount of governance;
- weight the set of agility scores based on a geographic region associated with the organization;
- provide output based on the calculation and the weighting; and
- alter work tasks in a workload to an ordering that is optimal for the organization based on the weighted agility scores.

14. The computer program product of claim 13, the computer readable storage device further comprising instructions to cause the system to determine a set of actions to be taken based on the output.

15. The computer program product of claim 13, the computer readable storage device further comprising instructions to cause the system to determine a management structure of the organization based on the set of keywords to determine a number of hierarchical layers of the management structure, the set of agility scores being further based on the management structure, wherein a higher agility score is calculated in the case that the management structure has a lower number of hierarchical layers.

16. The computer program product of claim 13, the computer readable storage device further comprising instructions to cause the system to identify one or more areas where information associated with the organization agility was lacking.

17. The computer program product of claim 13, the weighting of the set of agility scores being further based on: a set of industry vertical factors pertaining to a set of business needs of the organization, a size of the organization, and a competitive position associated with the organization.

18. The computer program product of claim 13, the output comprising a set of flagged documents that has an importance in the analyzing that exceeds a threshold; a set of legal documents, and a set of recommendations associated with the weighted set of agility scores.

19. A method for deploying a computing system having computer readable code and for executing the computer readable code on the computer system to cause at least one computer device on the computing system to perform a process for determining organizational agility of an organization across multiple computing domains, the process comprising:
   extracting, from one or more mail servers of the organization, a set of relevant historical organizational e-mail documents associated with an organization in a computer memory medium;
   fetching a set of electronic documents from an intranet of the organization via a web crawler;
   analyzing the set of relevant historical organizational e-mail documents and the set of electronic documents by parsing the set of relevant historical organizational e-mail documents and the set of electronic documents for a set of keywords that is indicative of the organizational agility of the organization, each of the set of keywords having an associated score, the organizational agility based on an amount of governance within the organization;
   determining trends across disparate documents in the set of relevant historical organizational e-mail documents and the set of electronic documents combined with customer and enterprise insights mined from social media content using deep text and data analytics;
   calculating a set of agility scores based on the analysis of scores associated with the set of keywords using a set of agility computation rules, wherein a higher agility score is calculated in the case that the set of keywords indicate a lower amount of governance;
   weighting the set of agility scores based on a geographic region associated with the organization;
   providing output based on the calculation and the weighting; and
   altering work tasks in a workload to an ordering that is optimal for the organization based on the weighted agility scores.

\* \* \* \* \*